United States Patent
Olapinski et al.

(10) Patent No.: US 6,749,747 B1
(45) Date of Patent: Jun. 15, 2004

(54) FILTER MEMBRANE MODULE COMPRISING AN INTEGRATED HEAT EXCHANGER

(75) Inventors: Hans Olapinski, Aichwald (DE); Dieter Bläse, Mutlangen (DE); Hans-Peter Feuerpeil, Schwäbisch Gmund (DE)

(73) Assignee: Membraflow GmbH & Co. KG, Aalen-Essngen (DE)

( * ) Notice: Subject to any disclaimer, the term of this patent is extended or adjusted under 35 U.S.C. 154(b) by 0 days.

(21) Appl. No.: 10/130,803

(22) PCT Filed: Nov. 15, 2000

(86) PCT No.: PCT/EP00/11301

§ 371 (c)(1),
(2), (4) Date: Oct. 10, 2002

(87) PCT Pub. No.: WO01/39857

PCT Pub. Date: Jun. 7, 2001

(30) Foreign Application Priority Data

Nov. 30, 1999 (DE) .......................................... 199 57 641

(51) Int. Cl.[7] .......................... B01D 29/11; B01D 35/18; B01D 63/06; F28D 1/00
(52) U.S. Cl. ............... 210/184; 210/321.89; 210/500.1; 210/500.21; 210/500.25
(58) Field of Search ............................ 210/175, 184, 210/321.6, 321.87, 321.88, 321.89, 500.1, 323.2, 500.21, 500.25

(56) References Cited

U.S. PATENT DOCUMENTS

| | | | |
|---|---|---|---|
| 4,172,038 A | 10/1979 | Appenzeller et al. | 210/332 |
| 4,849,104 A | 7/1989 | Garcera et al. | 210/323.2 |
| 4,906,362 A | 3/1990 | Holm et al. | 210/196 |
| 5,389,255 A * | 2/1995 | Danziger et al. | 210/321.75 |
| 5,906,739 A | 5/1999 | Osterland et al. | 210/321.81 |

FOREIGN PATENT DOCUMENTS

| | | |
|---|---|---|
| DE | 28 00 425 | 7/1979 |
| DE | 3411675 | 10/1985 |
| EP | 0 270 051 | 12/1986 |
| EP | 0 333 753 | 1/1992 |
| EP | 0 748 250 | 9/1998 |
| WO | WO 88/03829 | 6/1988 |
| WO | WO 95/23639 | 9/1995 |

\* cited by examiner

*Primary Examiner*—Fred G. Prince
(74) *Attorney, Agent, or Firm*—Baker & Daniels

(57) ABSTRACT

The invention relates to a membrane module in order to filter media which are capable of flowing. Said module incorporates an integrated heat exchanger. According to the invention, the membrane module has the following characteristics: a plurality of rod-shaped, porous, ceramic filter elements (1) (ceramic rods); the ceramic rods (1) are provided with continuous bores (1.1) located parallel to an axis; the ceramic rods are arranged parallel to each other and a lid (3, 4) covers the end thereof: the ceramic rods (1) are sealed at their circumferences against the lid (3, 4); a lid (3) located at one of the membrane modules is provided with an inlet (2.1) for the medium to be treated and a lid (4) located at the other end is provided with an outlet (2.2) in order to allow the media to flow out; each ceramic rod (1) is surrounded by a sheath tube (5): an annular gap (6) is situated between the sheath tubes of each ceramic rod and the inner surface of the corresponding sheath tubes: the annular gaps are conductingly connected to each; the lid (3, 4), ceramic rods and casing pipes (5) are surrounded by a housing (2) which is securely connected to the lid; the housing (2) comprises an inlet (2.3) for the introduction of permeate into the annular (6) gap and an outlet for draining off permeate from the annular gap. The housing also comprises an inlet (2.7) and an outlet (28) for directing a thermally conducting material through the intermediate chamber pertaining to each individual sheath tubing (5) and the housing (2); each ceramic rod (1) is surrounded by an interrupted tube (8) which is located in the annular gap (6) and extends over a substantial proportion of the length of said gap.

14 Claims, 4 Drawing Sheets

FILTER MEMBRANE MODULE COMPRISING AN INTEGRATED HEAT EXCHANGER

The invention involves a device for the filtration of pourable media using porous, ceramic rods. Devices of this type are used in numerous industry branches, for example, in the food industry or in the pharmaceutical industry.

Such a membrane module has become known, for example, from the patent EP 0 270 051. EP 0 748 250 B1 describes a membrane module in which the annular gap between the individual ceramic rod and the sheath surrounding it is completely filled by permeate, and thus free of any solids.

EP 0 333 753 B1, on the other hand, describes a device in which the collecting chamber surrounding the ceramic rod is filled from a large quantity of small filling bodies, which should make it so that the motive pressure over the length of the ceramic rod is as uniform as possible.

Devices of the type named above function exclusively for the filtration of media. In the process, a tempering, for example, cooling or heating, of the medium to be filtered, can be necessary for reasons of the filtration properties and/or the product treatment. According to the state of the art, special heat exchangers are provided for this purpose. Furthermore, it is known to equip filter membrane housings with a double sheath, in order to conduct a heating or cooling medium through the intermediate spaces.

In the process, it is desirable that especially large quantities of heat are exchanged in the entire membrane module. If the heat exchange operation is sufficient in the membrane module, then subsequently connected heat exchangers may be rendered unnecessary.

The purpose of the invention is to design a membrane module according to the generic concept of claim 1 in such a way that its heat exchanging capacity is increased relative to the aforementioned state of the art, and that in the process the equipment expense and the manufacturing costs arc kept as low as possible.

This purpose is achieved by the characteristics of claim 1. According to it, the individual ceramic rod is surrounded by a tube which is thus located in the annular gap between the outer surface of the ceramic rod and the sheath pipe. The tube is interrupted so that medium can flow through it from the inside to the outside or from the outside to the inside. The tube extends over a significant part of the length of the annular gap, and at best over its entire length. The tube can be made out of any metal, for example, out of plastic or out of steel. It can, for example, be constructed as a fabric, interwoven textile, or knit fabric. It can be made out of a perforated sheath.

The basic idea behind it is the following: The medium is conducted on its flowing path through the annular gap not only in the axial direction, but it is also forced into radial movements. In the process, it collides with the inner surface of the corresponding sheath pipe. In this way, the heat transfer between the medium and the sheath pipe is intensified, and to be precise, either in the sense of a heating or cooling of the medium, depending on the individual case.

A tube of this type can be inserted very easily into the module unit, but also just as easily removed, for example, for the purposes of cleaning. Functionally the individual tube is affixed onto the seal that is located between the one cap and the housing.

The invention is explained using the drawings. In them, the following is shown in detail:

Figure 1:
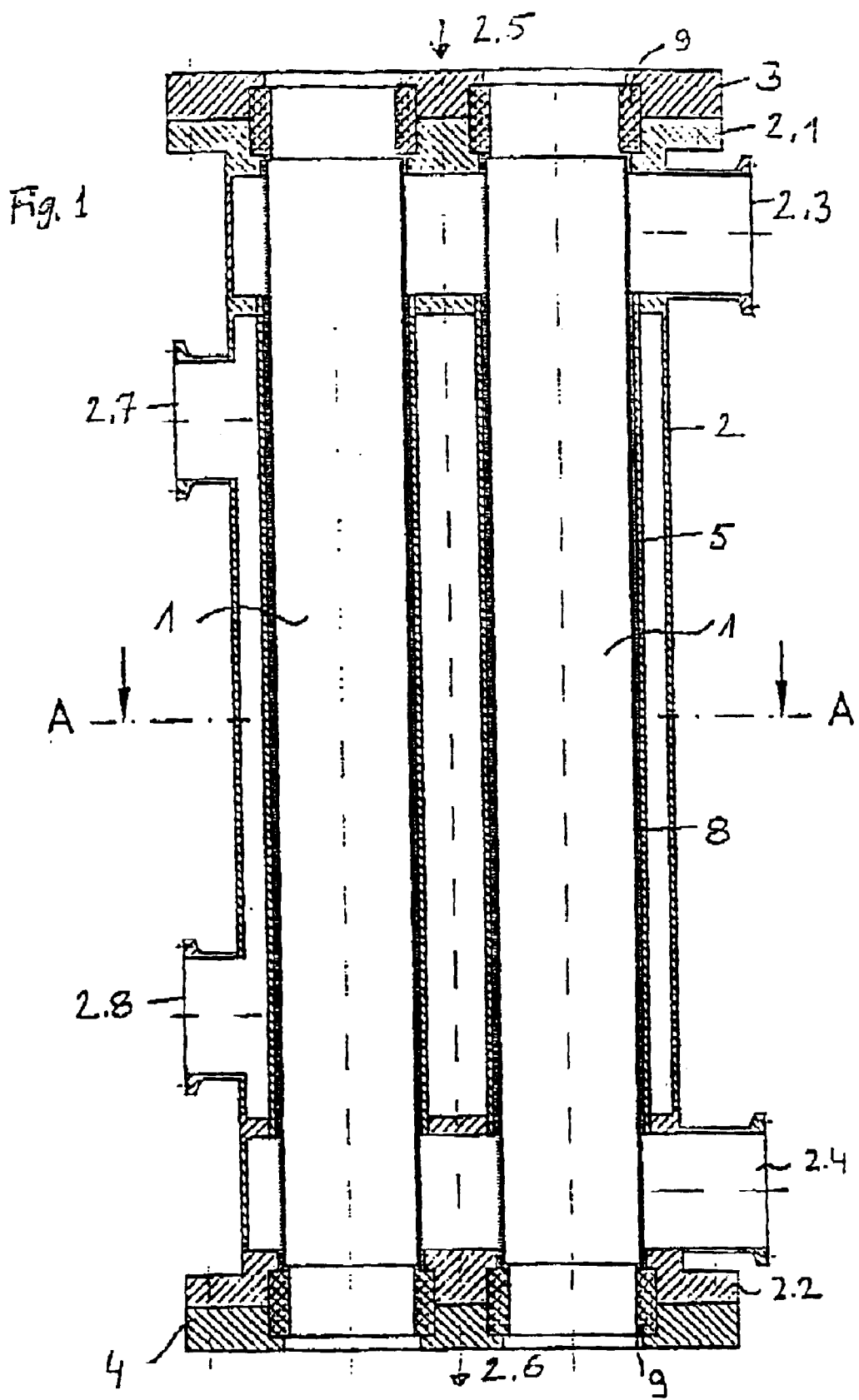
FIG. 1 shows a membrane module in a front view.

The membrane module is only shown schematically in FIG. 1. Two ceramic rods 1 are shown. They consist of porous, ceramic material.

These rods are located in a housing 2. They are, furthermore, clamped on their two ends in caps. See the upper cap 3 and the lower cap 4 with the housing flanges 2.1, 2.2.

The housing has on its upper end an intake 2.5 for the medium to be treated, and on its lower end an outlet 2.6. Intake and outlet are only shown schematically here by the arrows. Furthermore, the intake 2.3 and the outlet 2.4 for the permeate, as well as the intake 2.7 and the outlet 2.8 for the heat exchange medium can be recognized.

Figure 2:
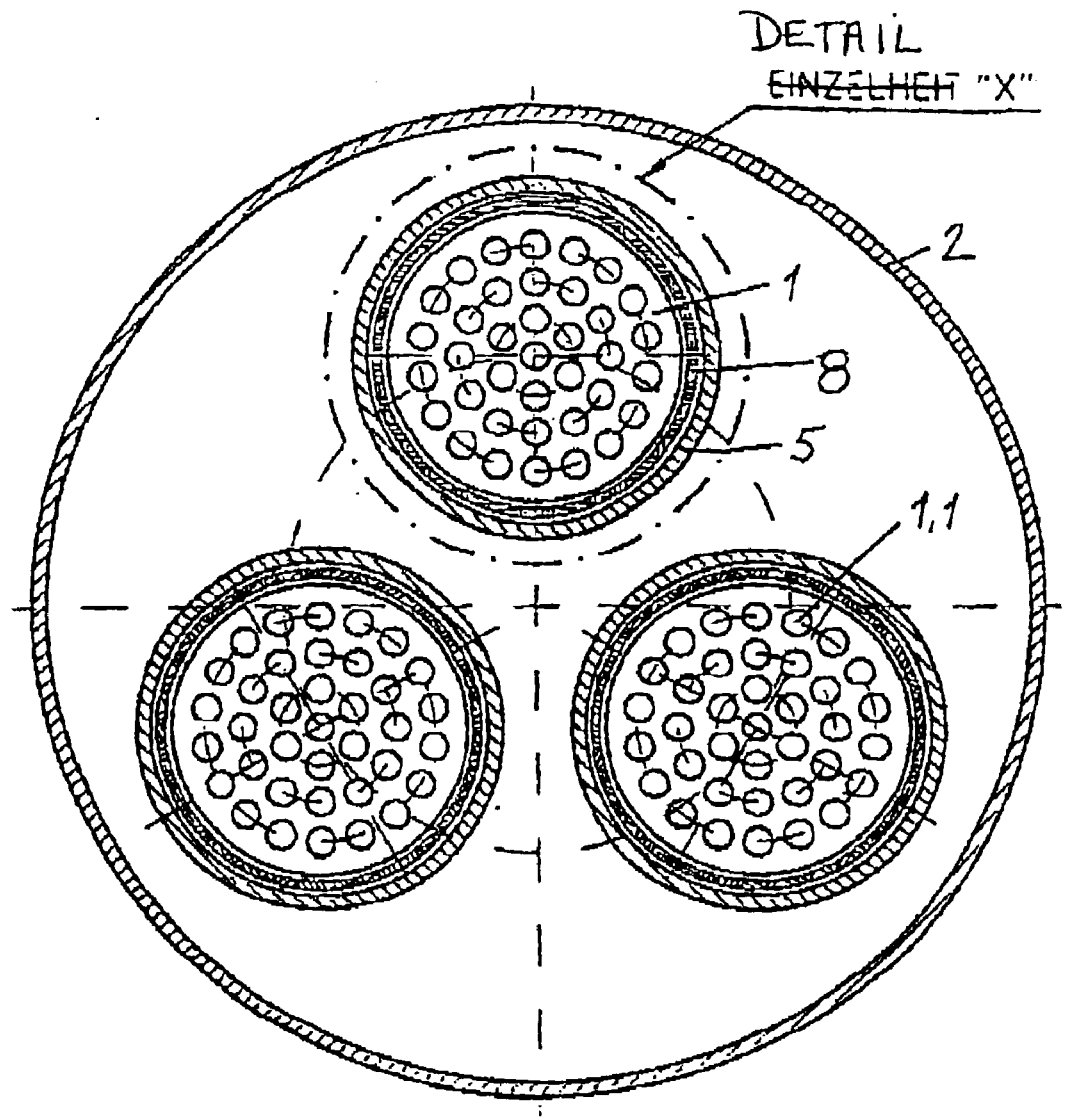
FIG. 2 shows the object of FIG. 1 in a sectional view in the section plane A—A in FIG. 1, and specifically, in an enlarged scale.

As can be seen from FIG. 2, the membrane module contains three ceramic rods 1. This is, however, only one example. Each ceramic rod 1 is in turn provided with 37 through-passage bore holes, which extend in the longitudinal direction through the individual ceramic rod from the top to the bottom. In the process, neither the number of ceramic rods per module nor the number of bore holes per ceramic rod is significant in relation to the invention. Thus, other numbers could also be provided.

Figure 3:
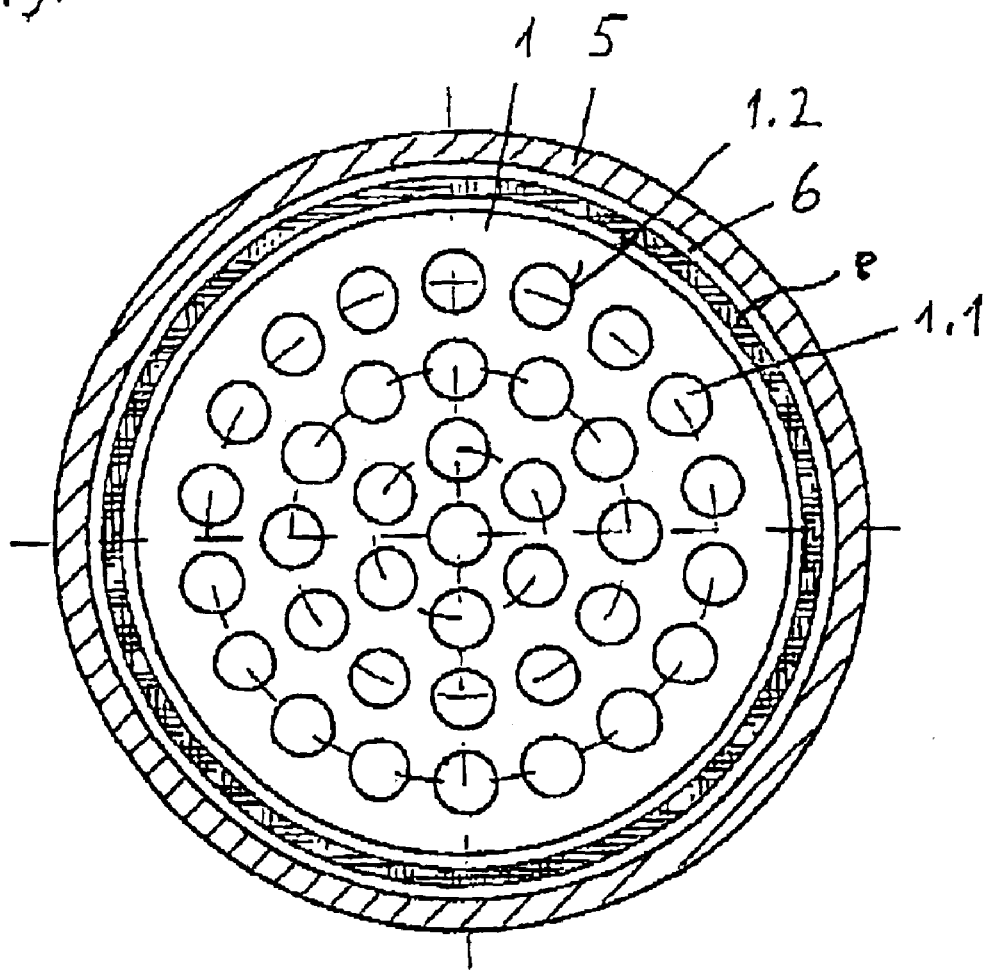
FIG. 3 shows the detail X from FIG. 2 in an enlarged scale.

FIG. 3 shows the detail X from FIG. 2, in turn in enlarged scale. As can be seen, the ceramic rod 1 is surrounded by a sheath pipe 5. The sheath pipe 5 has an excess dimension relative to the ceramic rod 1. In this way, between the outer surface of the ceramic rod 1 and the inner surface of the sheath pipe 5, an annular gap 6 is formed. The annular gap 6 extends over the entire length of the ceramic rod 1. Its significance will be addressed in the following in relation to FIG. 4.

The inner walls of the bore holes 1.1 are coated with a membrane material 1.2. Such a coating is, however, only reproduced as an example. It is not decisive for the invention.

Figure 4:
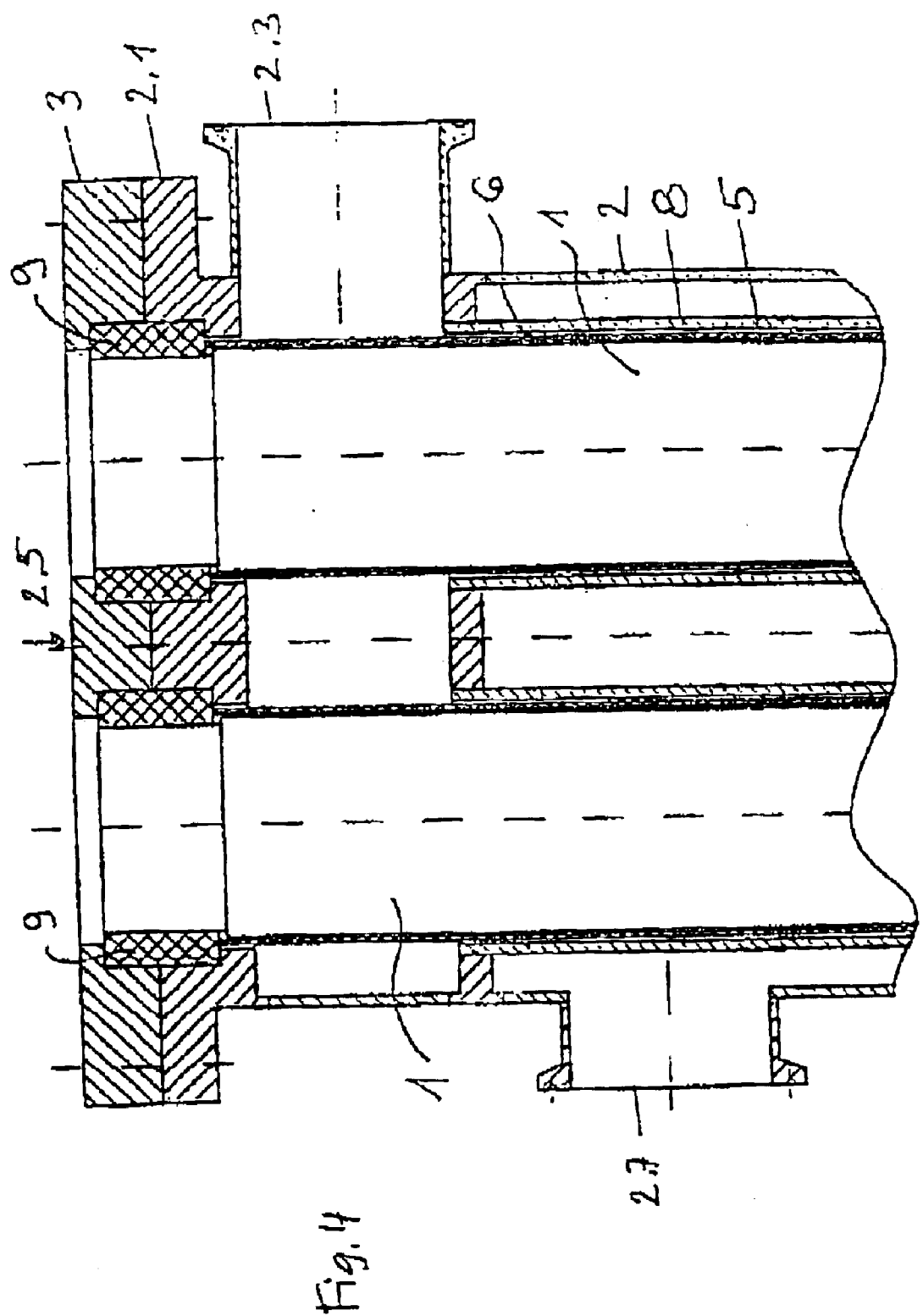
FIG. 4 shows the upper part of the object of FIG. 1 in an enlarged scale.

The decisive characteristics of the invention can be gathered from FIG. 4. This involves the upper area of the membrane module of FIG. 1.

The two ceramic rods 1, which like all other ceramic rods run parallel to each other, thus in the direction of the longitudinal axis of the membrane module, can be recognized. In addition, an intake 2.3 for permeate can be seen.

Each ceramic rod 1 is in turn concentrically surrounded by a sheath pipe 5, and to be precise, of the type such that an annular gap 6, also concentric, remains between the inner surface of the sheath pipe 5 and the outer surface of the associated ceramic rod 1.

According to the invention, each ceramic rod 1 is assigned a perforated tube 8. The tube 8 encloses the relevant ceramic bar 1 in a concentric manner. It can completely fill the annular gap 6 in the radial direction in such a way that it rests both on the outer surface of the ceramic rod 1 as well as on the inner surface of the sheath pipe 5 in a contacting manner. A certain open space can, however, also remain.

In the case presented, each of the tubes 8 shown is affixed between associated seals 9. In this way, an easy installation and removal of the relevant tube together with the seal is possible. Another possibility not shown here in detail consists in affixing the tube 8 to the housing flange 2.1 and/or 2.2.

The tube 8 consists of a metal fabric in the case presented. It could also be made out of an interwoven textile or knit fabric. It is also conceivable to construct the tube as a sheet metal sleeve or sheath made of another material, provided with through-passage openings, for example, a multitude of punched bore holes or slots. The tube 8 can also be manufactured from a material other than metal, for example, plastic.

The tube has the following effect according to the invention: a certain turbulence is created in the annular gap 6. The medium that flows from top to bottom in the annular gap is constantly deflected and in the process collides against the inner surface of the sheath pipe 5. In the process, the heat exchange between the medium and the sheath pipe 5 is made more intense, which is desirable. The medium is thus more intensively cooled or intensively heated, depending on the nature of the practical application.

The sheath pipe 5 generally is made out of metal. It can be manufactured quite precisely in its dimensions, especially in its inner diameter. The case is different for the ceramic rod 1. For it, a distortion can occur so that the ceramic rod 1 has, for example, a bend around its longitudinal axis. This in turn causes the annular gap 6 to have a variable width at different points along the length of the membrane module. The invention can nonetheless be easily made. The wall thickness of the tube according to the invention needs namely only to be measured in such a way that it also has sufficient space on the narrowest point of the annular gap 6. A certain elasticity of the tube structure is desirable in this case.

All annular gaps 6 are in a conductive connection with one another. They are thus also in a conductive connection with the permeate intake 2.3 and the permeate outlet 2.4.

What is claimed is:

1. A membrane module with an integrated heat exchanger, a number of rod-shaped, porous, ceramic filter elements comprising ceramic rods (1);

the ceramic rods (1) have axis-parallel through-passage bore holes (1.1);

the ceramic rods are arranged parallel to each other and clamped at their ends by caps (3, 4);

the ceramic rods (1) are sealed off against the cap (3, 4) on their circumference;

the cap (3) located on an end of the membrane module has an intake (2.1) for the supply of the medium to be treated, and the cap (4) located on the other end has an outlet (2.2) in order to carry away medium;

each ceramic rod (1) is surrounded by a sheath pipe (5);

between the outer surface of each ceramic rod (1) and the inner surface of the corresponding sheath pipe (5), an annular gap (6) is located;

the annular gaps (6) are in conductive connection with each other;

the caps (3, 4), the ceramic rods (1) as well as the sheath pipes (5) are enclosed in a housing (2), which is affixed to the caps (3, 4);

the housing (2) has an intake (2.3) for introduction of permeate into the annular gap (6), and an outlet (2.4) for carrying away permeate from the annular gaps (6), and furthermore an intake (2.7) and an outlet (2.8) for conducting a heat transfer medium through the intermediate space between the individual sheath pipe (5) and the housing (2);

each ceramic rod (1) is surrounded by a tube (8) with openings, which is located in the annular gap (6) and which extends at least over a significant part of its length.

2. Membrane module according to claim 1, characterized in that the tube (8) extends over the entire length of the annular gap (6).

3. Membrane module according to claim 2, characterized in that the tube (8) is made out of a fabric, interwoven textile or knit fabric.

4. Membrane module according to claim 2, characterized in that the tube (8) is made out of plastic.

5. Membrane module according to claim 2, characterized in that the tube (8) is made out of stainless steel.

6. Membrane module according to claim 1 or 2, characterized in that the tube (8) is made out of a perforated or slit sheath.

7. Membrane module according to claim 1, characterized in that the tube (8) is made out of fabric, interwoven textile or knit fabric.

8. Membrane module according to claim 3, characterized in that the tube (8) is made out of plastic.

9. Membrane module according to claim 7, characterized in that the tube (8) is made out of stainless steel.

10. Membrane module according to claim 1, characterized in that the tube (8) is made out of a perforated or slit sheath.

11. Membrane module according to claim 10, characterized in that the tube (8) is made out of plastic.

12. Membrane module according to claim 10, characterized in that the tube (8) is made out of stainless steel.

13. Membrane module according to claim 1, characterized in that the tube (8) made out of plastic.

14. Membrane module according to claim 1, characterized in that the tube (8) is made out of stainless steel.

* * * * *

UNITED STATES PATENT AND TRADEMARK OFFICE
CERTIFICATE OF CORRECTION

PATENT NO. : 6,749,747 B1
DATED : June 15, 2004
INVENTOR(S) : Hans Olapinski et al.

It is certified that error appears in the above-identified patent and that said Letters Patent is hereby corrected as shown below:

<u>Column 3,</u>
Line 34, after "exchanger," insert -- said module comprising --.

Signed and Sealed this

Twenty-fourth Day of May, 2005

JON W. DUDAS
*Director of the United States Patent and Trademark Office*